Feb. 14, 1967 E. O. BLODGETT 3,304,410
TABULATING CARD READER
Filed Jan. 3, 1963 10 Sheets-Sheet 1

INVENTOR
EDWIN O. BLODGETT
BY John A. Harvey
ATTORNEY

Feb. 14, 1967  E. O. BLODGETT  3,304,410
TABULATING CARD READER
Filed Jan. 3, 1963

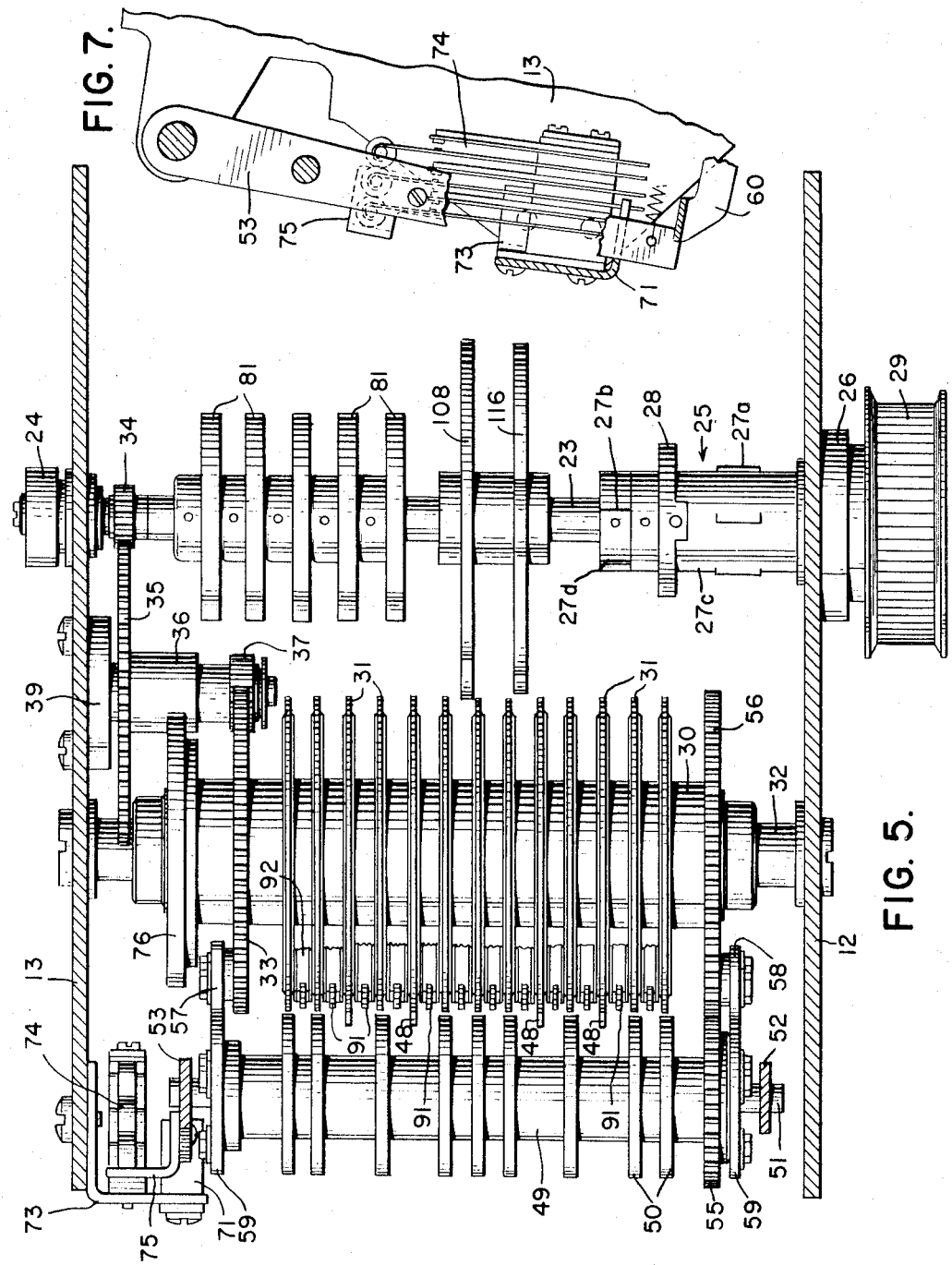

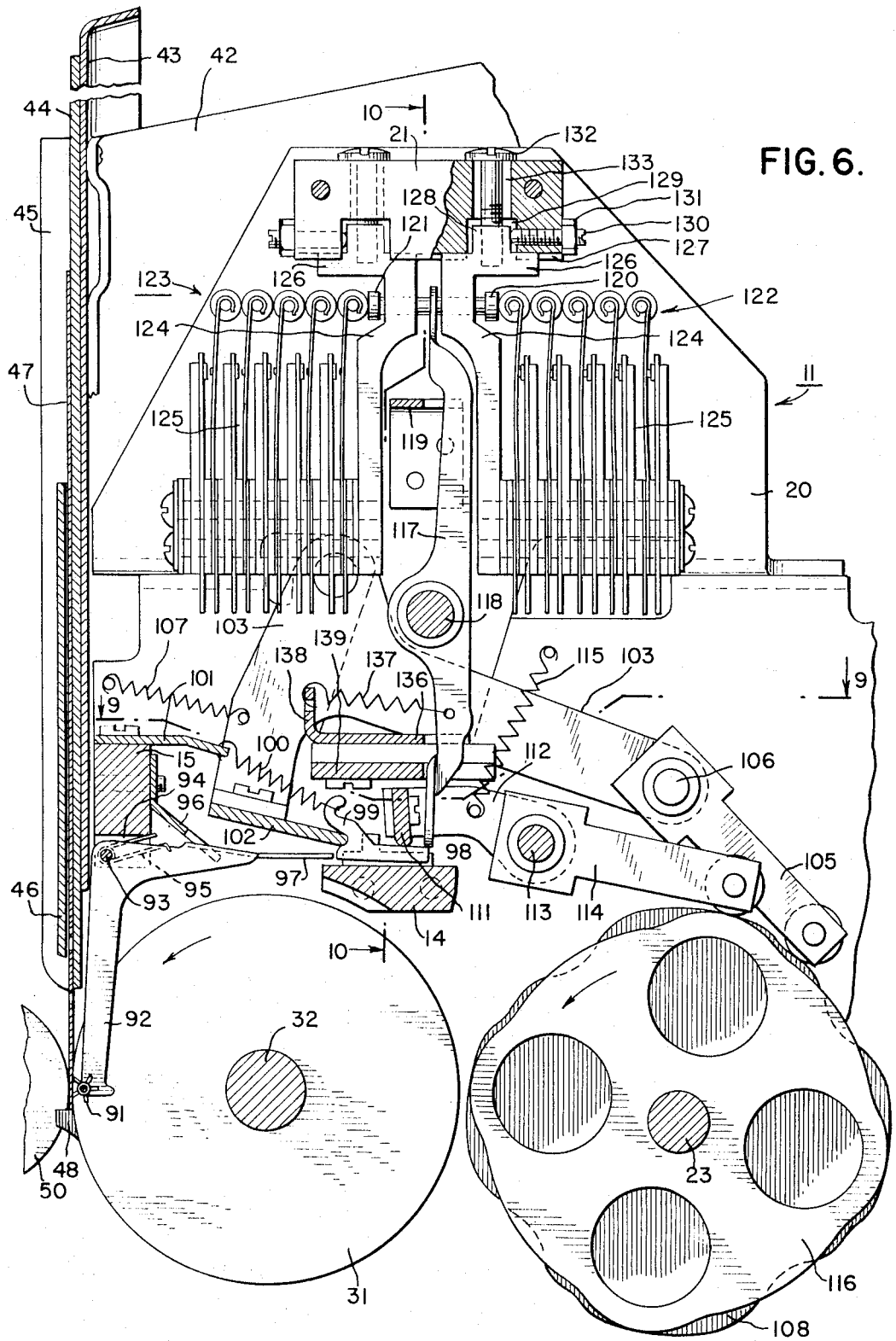

Feb. 14, 1967   E. O. BLODGETT   3,304,410
TABULATING CARD READER
Filed Jan. 3, 1963   10 Sheets-Sheet 9

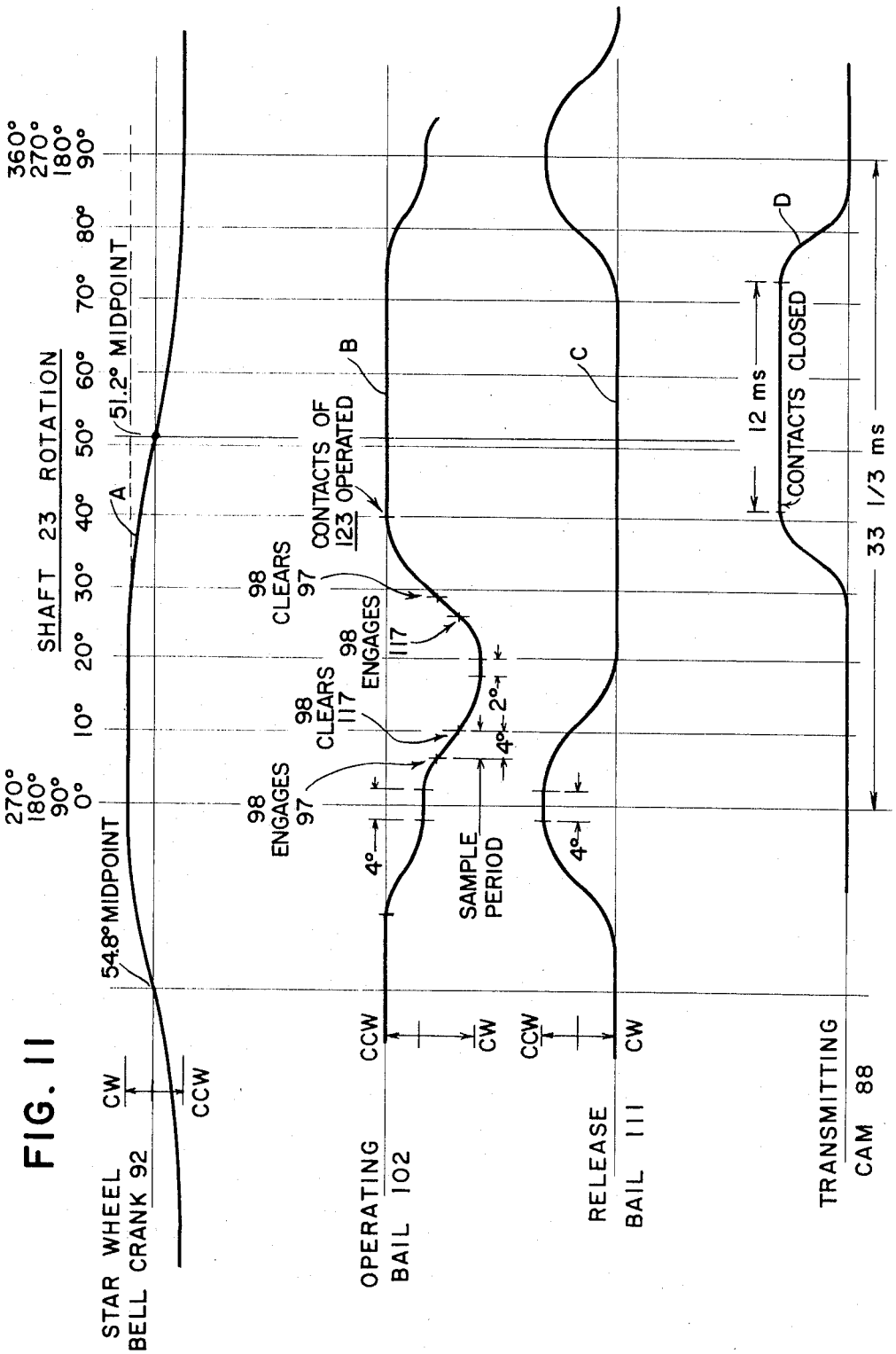

United States Patent Office 3,304,410
Patented Feb. 14, 1967

3,304,410
TABULATING CARD READER
Edwin O. Blodgett, Rochester, N.Y., assignor, by mesne assignments, to Friden, Inc., San Leandro, Calif., a corporation of Delaware
Filed Jan. 3, 1963, Ser. No. 249,228
17 Claims. (Cl. 235—61.11)

The present invention relates to tabulating card readers and, particularly, to such readers which derive the punch-code recorded information of the card by mechanically sensing its code apertures yet which supply the derived information for utilization as coded electrical signals.

Tabulating cards are widely used to record alphanumeric characters, symbols, and machine-function control items of information by use of conventional punch codes. The recording area of the card is considered as made up of columns and rows of index points, the rows being arranged parallel to a longitudinal median line of the area and having pre-assigned code values while the columns are arranged from end to end of the card perpendicular to a longitudinal median line and record successive items of information. An "index point" conventionally refers to each of plural assigned positions of the card area at which a code aperture may be punched in recording coded information. The code apertures may have either rectangular configuration with the long axis of the aperture extending transverse to a long axis of the card or may be circular. Cards punched with rectangular apertures are conventionally read by continuous movement of the card either lengthwise or edgewise past reading brushes which sense concurrently the apertures in successive index point columns or in successive index point rows. The edgewise direction of card movement requires some form of storage of information concerning all code apertures read in the card, since this information is required for later decoding and use of alphanumeric characters recorded by successive columns of the card, but edgewise reading nevertheless has the advantage that it enables the reading brushes to dwell in a card aperture for a longer interval of time. Cards punched with circular apertures are usually read by edgewise movement of the card into a stationary reading position where an array of mechanical sensing pins, corresponding in position to the array of index points of the card, may sense concurrently all code apertures punched in the card.

In certain applications where the punched card moves lengthwise through the card reader to read and immediately use successive items of recorded information, the code apertures are often sensed by mechanical aperture sensing devices in preference to electrical reading brushes. One form of mechanical aperture sensing device is comprised by a star wheel rotationally supported at the end of a pivoted lever and arranged in alignment with an individual index-point row of the card. Adjacent pairs of teeth of the star wheel non-rotationally engage the card's surface to keep the end of the pivoted lever spaced from the card until a tooth of the wheel enters a code aperture, whereupon the end of the lever moves by spring bias closer to the card's surface with resultant angular rotation of the lever. This angular rotation of the lever is used to control a pair of electrical contacts between their contact-open and contact-closed positions. The contact actuating force available is relatively small since it is furnished only by the spring bias of the pivoted lever, which also biases the star wheel toward aperture sensing position. The maximum spring-bias operating force of the lever is one sufficiently small that the essentially point contact of the star wheel teeth with the card's surface does not cause the tooth to indent or penetrate the card's surface to any significant extent. Otherwise the teeth at best would undesirably groove the card's surface and, at worst, would exert a restraining force on the card feed movement or even halt the card feed under exaggerated conditions. Thus, only relatively light-weight contacts may be activated by the star wheel lever in readers of this type heretofore available.

In certain uses of a tabulating card reader, it is desirable to provide a group or stack of separate contacts for each of the different index point rows in the card and upon sensing a code operation to operate simultaneously the contacts of corresponding group or stack for such purposes as code translation or for conversion of the tabulating card code to another code form. For example, it is desirable to detect or translate certain machine control codes directly by reader contact operation and also to provide contact capacity for translating the Hollerith type tabulating card code directly to a six or seven bit binary type code.

Accordingly it is an object of the present invention to provide a new and improved tabulating card reader of the star-wheel reading type and one wherein power drive forces of substantial magnitude are available for operating under star wheel control the relatively heavy loads occasioned by use of stacks of simultaneously actuated electrical contacts.

It is a further object of the invention to provide a novel power driven tabulating card reader in which code aperture-sensing star-wheel reader elements are lightly biased into sensing positions by use of minimal bias force yet provide positive and consistently reliable control over large available electrical-contact actuating forces.

It is an additional object of the invention to provide an improved tabulating card reader of relatively simple, yet sturdy and compact construction characterized by consistently high operational reliability over prolonged periods of operation and without need for significant maintenance care or attention.

Other objects and advantages of the invention will appear as the detailed description thereof proceeds in the light of the drawings forming a part of this application, and in which:

FIG. 5 is a cross-sectional plan view further illustrating the card transport structure of the reader;

FIG. 6 is an elevational cross-sectional view of the upper portion of the reader to illustrate the construction, arrangement and character of operation of the tabulating card reading components in relation to initiation of each card reading operation of the reader;

FIG. 7 is a fragmentary cross-sectional view illustrating the arrangement and actuation of certain control electrical contacts employed in the reader structure;

FIG. 11 graphically illustrates certain controlled motions of reader components and is used as an aid in explaining the operation of the reader.

Figure 1:
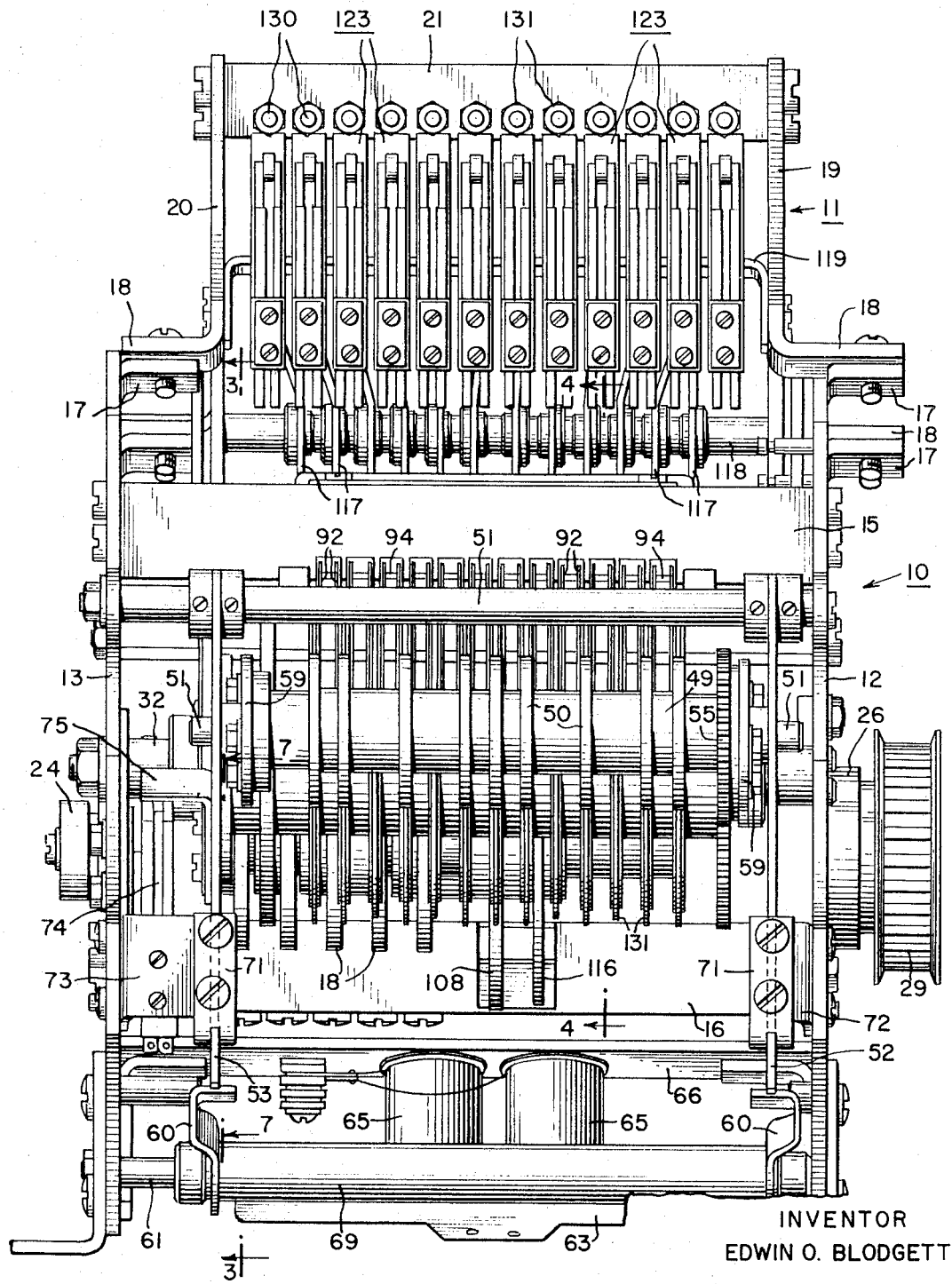
FIGS. 1 and 2 illustrate respective rear and side elevational views of a tabulating card reader embodying the present invention.
Figure 2:
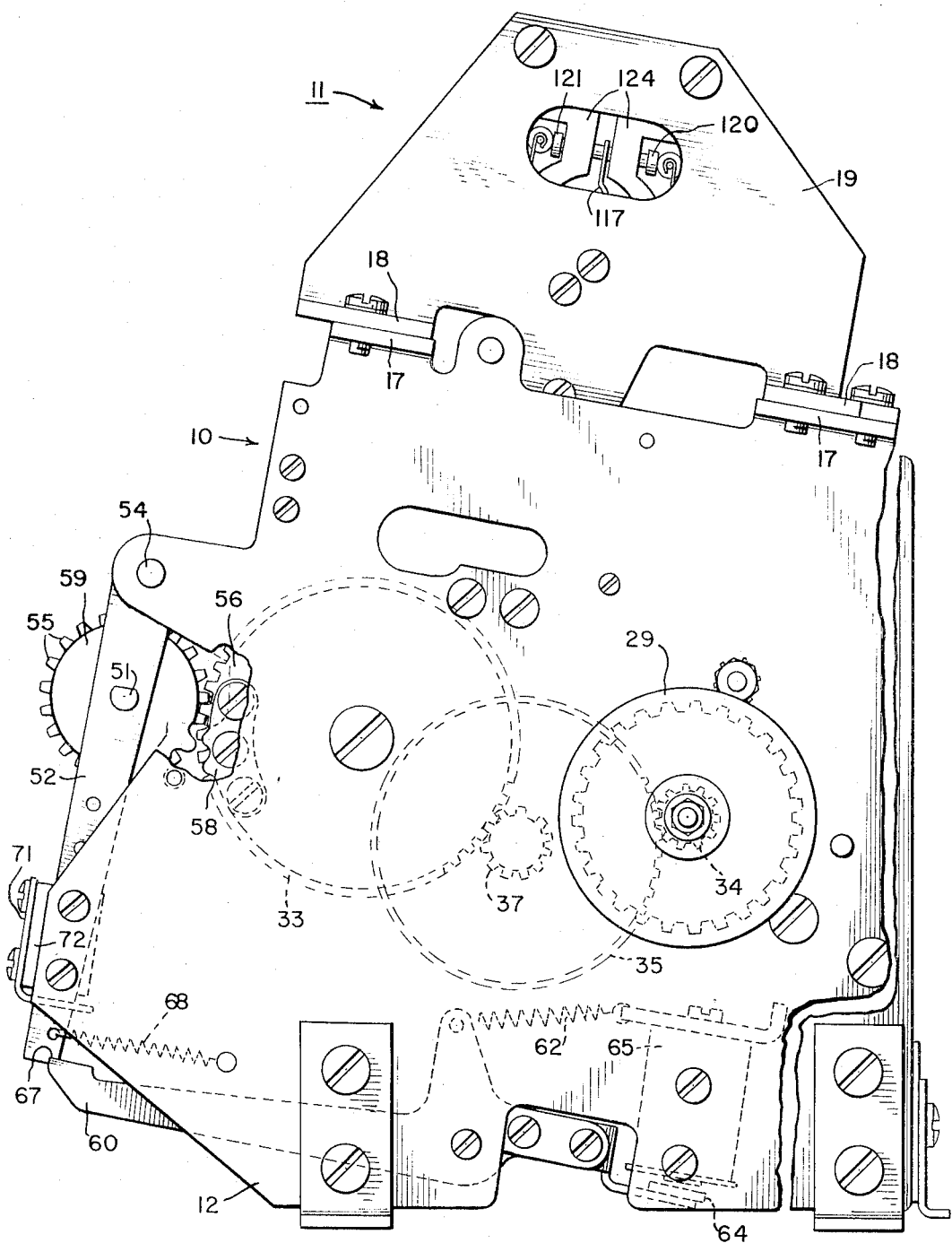

Referring now more particularly to FIGS. 1–6 of the drawings, there is illustrated a tabulating card reader embodying the present invention in a particular form. The reader is conveniently fabricated as a lower subassembly 10 and an upper subassembly 11. The lower subassembly 10 includes side plates 12 and 13 assembled in spaced relation by use of spacing bars 14, 15 and 16, the side plates having turned over flanges 17 to which the upper subassembly 11 is secured as shown by turned over flanges 18 of side plates 19 and 20 assembled in space relation by a spacing bar 21.

The tabulating card reader includes a power driven shaft 23 (FIG. 5) journalled at one end by a bearing structure 24 in the side plate 13 and journalled at its opposite end by a 90° helical spring wire clutch 25 which itself is journalled by a bearing 26 in the side plate 12. The clutch 25 is of conventional construction such as illustrated in U.S. Patent No. 2,927,158, except that four detent protruberances 27a and keeper notches 27b are provided on the respective clutch housing 27c and keeper member 27d and four knock-off lobes are provided on the clutch cam 28 rather than the pairs of these elements illustrated for the 180° clutch construction of the patent last mentioned. The clutch 25, according to the energization or de-energization of its control electromagnet, is thus operative at 90° rotational angles of the shaft 23 mechanically to connect the shaft to or disconnect it from a pulley 29 drivingly connected by a belt to a reader driving motor (not shown).

The reader includes a tabulating card main drive roll 30 fabricated with spaced card-engaging driving discs 31 and rotationally journalled on a shaft 32 supported by side plates 12 and 13. This main drive roll 30 is provided with a gear 33 which is driven from the shaft 23 by means of a speed reduction gear train. The latter includes a pinion gear 34 on the shaft 23 and having meshed engagement with an idler gear 35 integrally formed on a bushing 36 with a spaced pinion idler gear 37 in meshed engagement with the gear 33. The bushing 36 is rotationally supported on a stud 38 having a flange 39 secured by machine screws to the side plate 13. The ratio of the gears 34 and 35 and that of the gears 33 and 37 is selected in relation to the circumference of the main drive roll discs 31 such that each 90° angular rotation of the driving shaft 23 moves a tabulating card, in engagement with the peripheral surfaces of the discs 31, by a distance corresponding to the spacing between index-point columns of the card.

The tabulating card reader is enclosed within a housing, indicated in FIG. 6 as having a side wall 42 and a front panel 43, and there is provided on the front panel 43 a tabulating card guide structure. The latter is comprised by a plate 44 having laterally spaced and upstanding card guide flanges 45, and an intervening guide plate 46 supported in spaced relation to the plate 44 and adapted to cooperate with the latter and the flanges 45 to provide a guide aperture by which a tabulating card 47 is guided lengthwise into reading position in the reader. In the home position of a reader, at which the reading of each tabulating card begins, spaced ones of the main drive roll discs 31 are provided with projecting stop portions 48 which engage the end of the tabulating card 47 upon manual insertion of the card into reading position in the reader.

The reader is also provided with a card feed pressure roll 49 fabricated with spaced discs 50 arranged in opposing relation to those discs 31 of the main drive roll 30 which are devoid of the card stop portions 48. The pressure roll 49 is rotatably supported upon a shaft 51 extending between side arms 52 and 53 secured to a shaft 54 rotationally supported between the side plates 12 and 13. The pressure roll 49 is provided at one end with a gear 55 in meshed engagement with a gear 56 provided on the main drive roll 30. This meshable relationship of the gears 55 and 56 is maintained even during intervals when the main drive roll 30 and pressure roll 50 are moved to spaced relation near the end of each card reading operation. This spacing of the rolls is accomplished by segmental gears 57 and 58 (FIG. 5) provided as shown in axially aligned positions on the respective gears 33 and 56, and engageable with similarly aligned one-tooth gear segments 59 provided on each extremity of the pressure roll 49. Upon separation of the main feed roll 30 and pressure roll 49, by rotational engagement of the segmental gears 57 and 58 with their associated one-tooth gear segments 59 as occurs once for each one complete revolution of the main drive roll 30, both of the pressure roll supporting arms 52 and 53 are moved into latched engagement with individual ones of a pair of latch arms 60 (FIGS. 2 and 3) which are secured on a sleeve 69 rotatably supported on a shaft 61 extending between the side plates 12 and 13. The latch arms 60 are biased into latching position by a helical wire spring 62. The remote ends of the latch arms 60 are connected by a strap 63 to which is secured an armature 64 positioned opposite the pole pieces of electromagnets 65 supported upon a bracket 66 extending between the side plates 12 and 13. The initial conditioning of the reader for each new card reading operation is accomplished by brief electric energization of the electromagnets 65, which attract the armature 64 and rotate the latch arms 60 out of engagement with latch notches 67 provided on the remote ends of the idler roll supporting arms 52 and 53. The latter are biased by helical wire springs 68 for rotation on the shaft 54 to engage the pressure roll 49 against a tabulating card inserted into reading position in the reader and thus press the tabulating card against the discs 31 of the main feed roll 30. The gears 55 and 56 effect positive drive of the pressure roll 49 from the main drive roll 30 so that both rolls are effective in drivingly transporting the card through the reader. This double-roll drive of the card avoids any possibility of slippage between the card and main drive roll 30 so that successive index-point columns of the card are always accurately positioned for reading. Subsequent successive brief energizations of the electromagnet (not shown) of the clutch 25 effect step-by-step transport of the tabulating card by drive of the main drive roll 30 from the power driven shaft 23 in the manner earlier explained, each such step transport of the card corresponding to the space between successive index-point columns of the card.

The pressure roll supporting arms 52 and 53 are guided in their rotational movement on the shaft 54 by one-tooth comb brackets 71 mounted by machine screws on individual L-shaped brackets 72 and 73 secured by machine screws to the respective side walls 12 and 13. The bracket 72 also supports an electrical contact assembly 74 (FIGS. 1 and 7) having movable contacts which are actuated by an L-shaped bracket 75 secured by machine screws to the arm 53 as shown in FIGS. 1 and 5. In particular, the contacts of the contact assembly 74 are in open-contact position when the pressure roll 49 is latched in spaced relation to the feed roll 30 and are actuated to closed-contact position when the pressure roll is unlatched and moves to card engaging position. These electrical contacts are used in providing an indication in the electrical control system of the reader whether or not the pressure roll 49 is in its card engaging position.

Figure 3:
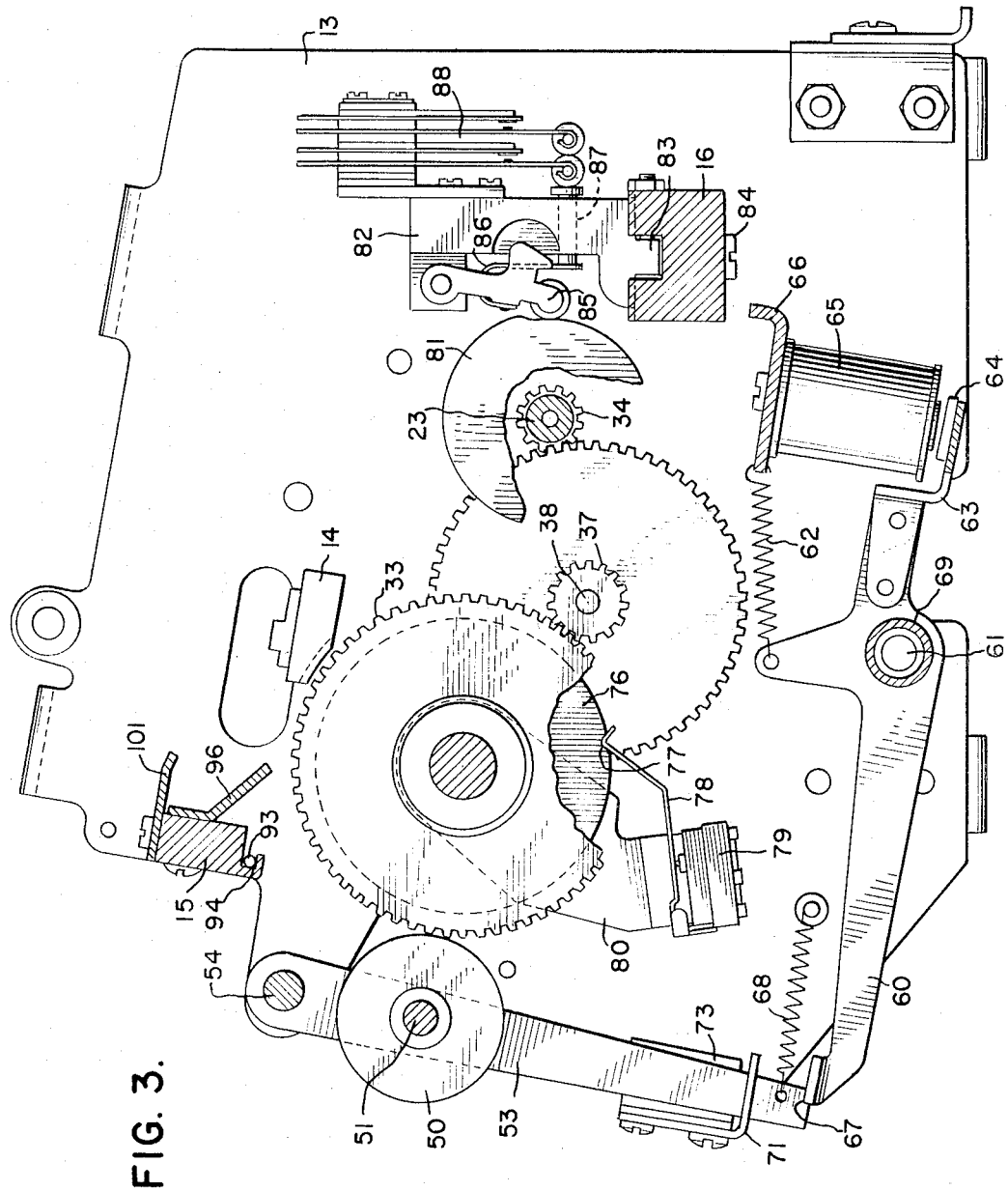
FIGS. 3 and 4 are elevational cross-sectional views illustrating the arrangement of components used in effecting movement of a tabulating card through the reader and in reading successive index-point columns of the card.

As shown more clearly in FIGS. 3 and 5, the main feed roll 30 is provided at one end with a cam disc 76 having on its periphery a single notch 77 engageable by a pivoted feeler lever 78 which operates a microswitch 79 mounted on an L-shaped bracket 80 secured to the side wall 13. The notch 77 of the disc 76 is located at the earlier mentioned "home" position of the main feed roll 30. This is the position at which each tabulating card reading operation of the reader terminates and a new reading operation subsequently begins, and the operation of the microswitch 79 by the feeler lever 77 thus provides an indication in the electrical control system of the reader whether or not the reader is at its "home" position.

The power driven shaft 23 of the reader is provided with a plurality of spaced cams 81 which are fixedly secured to rotate with the shaft. These cams operate individual contact subassemblies 82 which are non-rotatably positioned by a longitudinal slot 83 formed as shown in the upper face of the spacing bar 16 and are secured to the latter by machine screws 84. The subassemblies 82 include a cam-follower arm 85 biased into contact with the associated cam 81 by a leaf spring 86 which also through a plunger 87 actuates the movable contacts of an electrical contact assembly 88. These electrical contacts are used in a more complete electrical control system in which the tabulating card reader forms one component.

Figure 4:
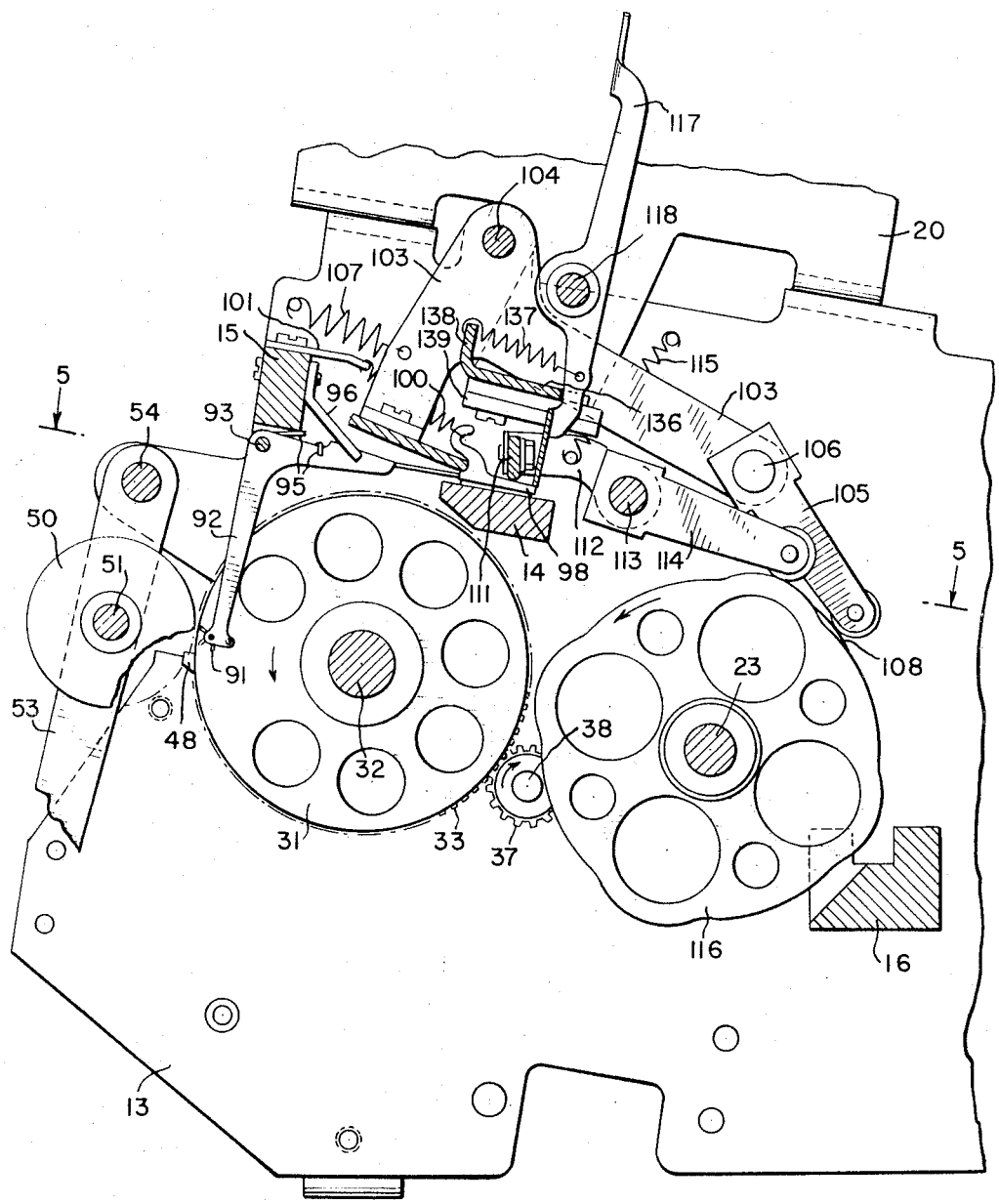
Figure 8:
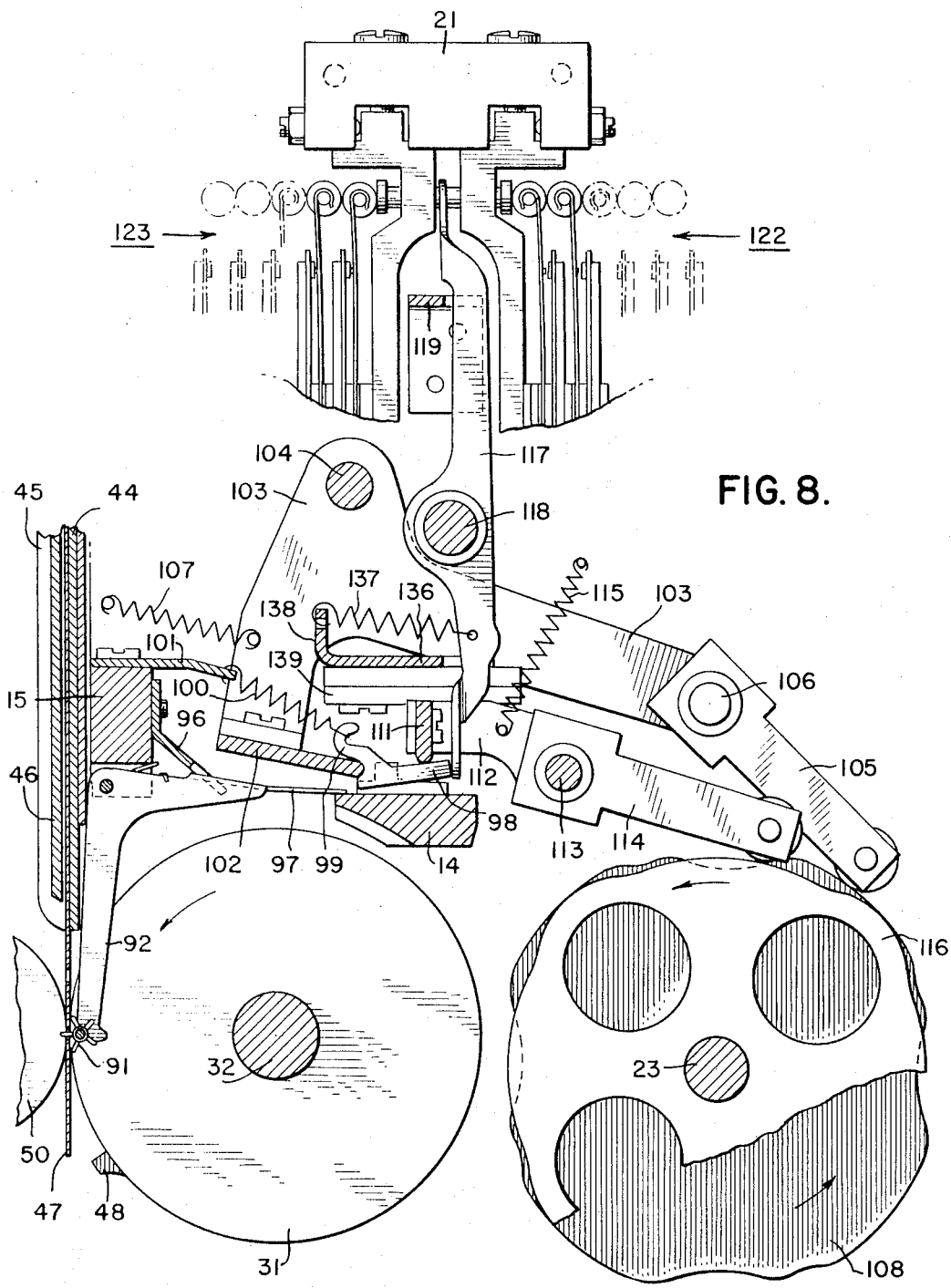
FIG. 8 is a cross-sectional view similar to FIG. 7 but illustrating an intermediate phase of operation of the reader.

The reader includes a plurality of tabulating-card code-aperture-sensing star wheels 91 rotatably supported as shown in FIGS. 4 and 6 at the ends of individual bell cranks 92, of U-shaped cross section, pivotally supported upon a shaft 93 positioned within a notch 94 (FIG. 3) of the spacing bar 15. The bell cranks 92 with their star wheels 91 are received between the flanges 31 of the main feed roll 30 as illustrated in FIG. 5. The star wheels of the several bell cranks 92 are aligned to sense concurrently each successive index-point column of the tabulating card transported through the reader, each of the star wheels sensing the code apertures in an individual index-point row of the card. Each of the bell cranks 92 is biased by a wire spring 95 toward code aperture sensing position wherein its associated star wheel 91 senses the presence and absence of code apertures in the tabulating card. Consider, for example, the "home" position of the main feed roll 30 illustrated in FIG. 6 where the projecting stop portions 48 engage and preposition the leading edge of the tabulating card 47 in readiness to begin a reading operation. The leading edge portion of the card has an unperforated area preceding the first index-point column of the card and, accordingly, two adjacent teeth of each star wheel 91 engage the surface of the card to maintain the bell cranks 92 rotated to a counter-clockwise position as seen in FIG. 6. Where, however, a code aperture is sensed in the card by the star wheel as illustrated in FIG. 8, a tooth of the star wheel projects through the code aperture and thus permits the associated bell crank 92 to rotate in a clockwise direction as seen in FIG. 8. These slight angular movements of the bell cranks 92 are guided by a comb 96 secured to the spacing bar 15.

The remote ends of the bell cranks 92 are provided with a flat latch portion 97. In the non-aperture sensing position of each bell crank 92, as illustrated in FIG. 6, the latch portion 97 is positioned to be engaged by an individual one of a plurality of pivotally supported reciprocal interposers 98 to restrict the range of reciprocal motion of the latter effected in a manner presently to be described. In the aperture sensing position of the bell crank 92, illustrated in FIG. 8, the latch portion 97 of the bell crank is positioned beneath its associated interposer 98 and thus does not limit the range of reciprocal motion of the interposer.

All of the interposers 98 are reciprocally guided by grooves formed in the upper surface portion of the spacing bar 14. Each interposer has an S-shaped end portion 99 biased by a helical wire spring 100, extending between the interposer portion 99 and a spring anchor plate 101 secured to the spacing bar 15, into engagement with a bail 102. The latter is supported at its ends by bell cranks 103 pivoted on individual studs 104 secured to the side plates 12 and 13 of the reader. The bail 102 and its supporting bell cranks 103 are reciprocated through a cycle of angular motion during each 90-degree rotation of the driven shaft 23 which, as previously explained, causes the main feed roll 30 to advance the tabulating card from one of its index-point columns to another.

Figure 9:
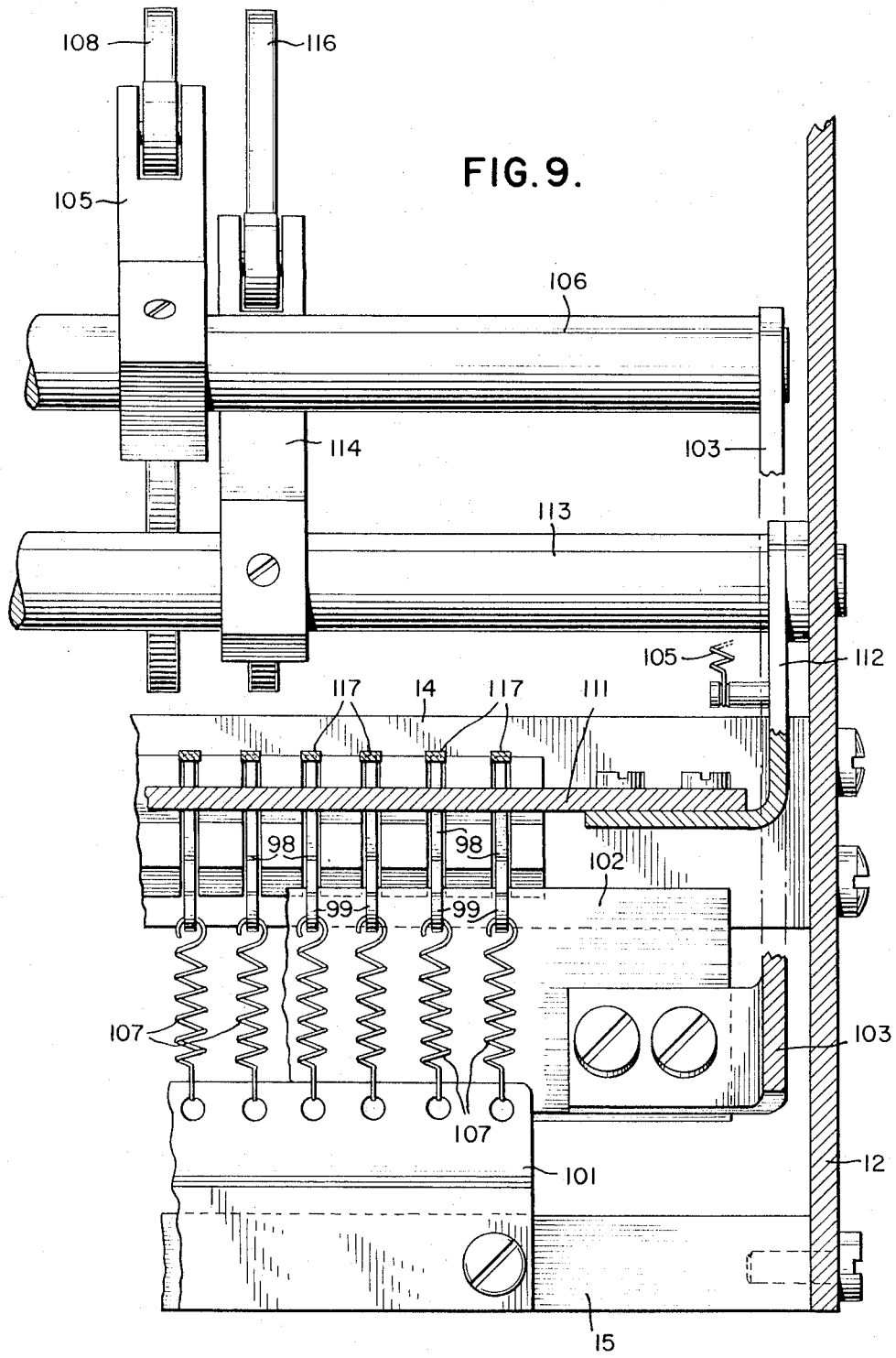
FIGS. 9 and 10 are fragmentary enlarged cross-sectional views illustrating certain details of construction of the reader.

This reciprocatory motion of the bail 102 and its supporting crank arms 103 is accomplished by a cam follower 105 which is fixed upon a shaft 106 (FIGS. 6 and 9) having its ends fixed to the bell crank arms 103, the cam-follower arm 105 being biased by a spring 107 into engagement with a cam 108 fixedly secured to the power driven shaft 23. As indicated in FIGS. 6 and 8, the cam 108 has four repetitive like lobe configurations spaced by 90 degrees corresponding to the four ninety-degree angular rotational step movements of the shaft 23 under control of the clutch 25. Each of these repetitive lobe configurations of the cam 108 includes a high step, an intermediate step and a low step. In each angular halt position of the shaft 23 as controlled by the clutch 25, the cam follower 105 rests upon the intermediate step of the cam 108 as illustrated in FIG. 6. This positions the bail 102 such that the interposers 98 have their ends spaced a short distance from the latch position 97 of each of the star wheel bell cranks 92.

For this position of the bail 102, all of the interposers 98 are engaged by an unlatch bail 111 which is supported at its ends by arms 112 fixedly secured to a shaft 113 journalled in the side plates 12 and 13. A cam follower 114 (FIGS. 6 and 9) is secured to the shaft 113 and is biased by a spring 115 into engagement with a cam 116 secured on the power driven shaft 23 and having four raised lobes spaced ninety degrees around the periphery of the cam 116. Upon engagement of the unlatch bail 116 with the interposers 98 at a time when the cam follower 114 rests upon a lobe of the cam 116, the right hand ends of the interposers (as seen in FIGS. 6 and 8) are depressed by the bail below the lower ends of individual ones of a plurality of contact actuating levers 117 pivotally mounted on a shaft 118 supported between the side walls 19 and 20 of the upper subassembly 11 of the reader.

Figure 10:
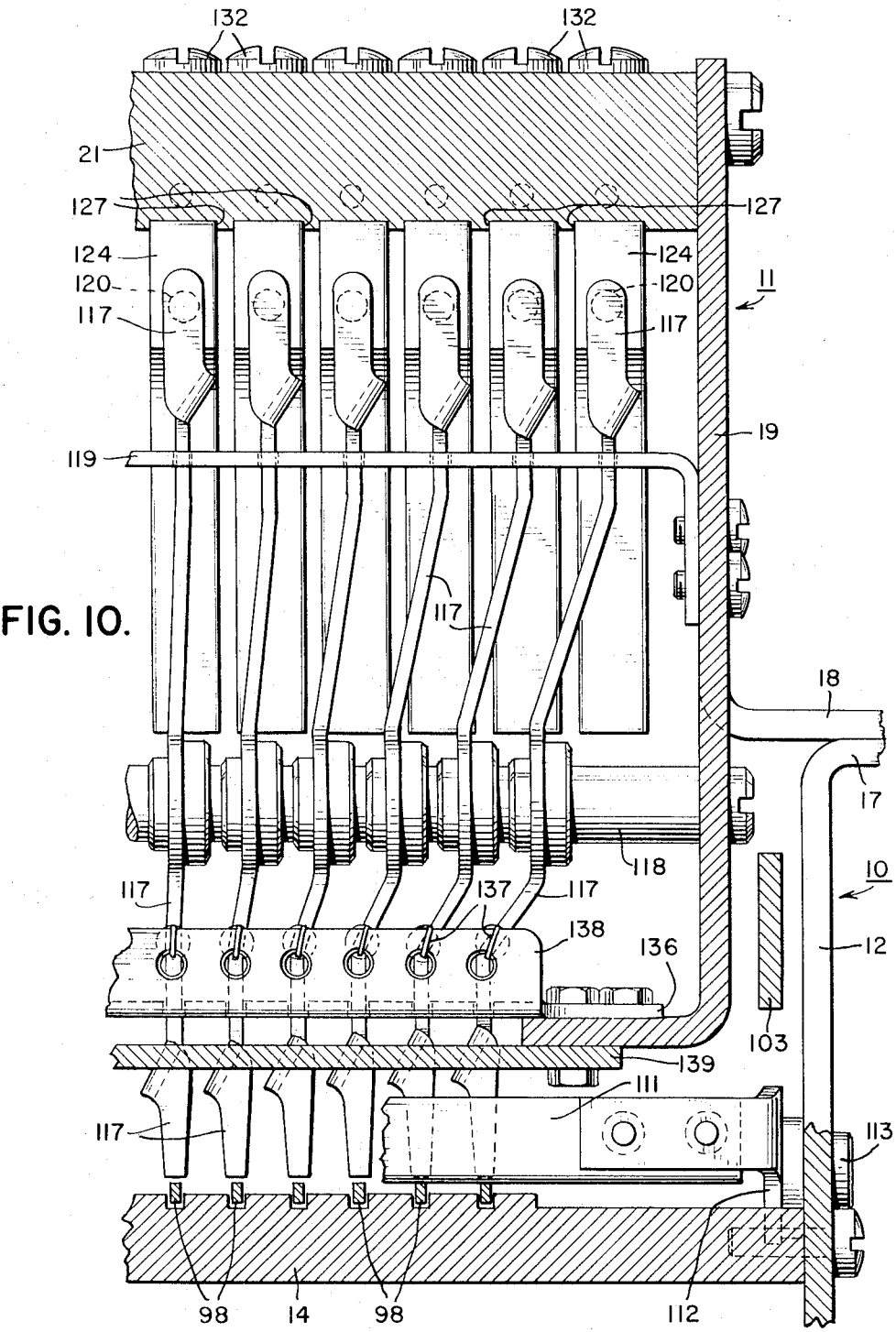

The contact actuating arms 117 may rotate through a small arc in a manner presently to be described, and are guided in this motion by a comb 119 supported between the side plates 19 and 20 of the subassembly 11. The upper end of each of the arms 117 engages oppositely disposed but axially aligned contact actuating pins 120 and 121 of two contact subassemblies 122 and 123, each having a base support member 124 upon which are mounted a stack of electrical contacts 125. Each of the base members 124 has an end foot portion 126 of rectangular cross-section which is received within and positioned by an individual one of plural transverse grooves 127 milled into the lower face of the spacing bar 21 of the upper subassembly 11. Each foot 126 of the base support members 124 has an integral extension 128 of square cross-section which is received within a longitudinal groove 129 of the spacing bar 21 and is positioned laterally within the groove by a set screw 130 having a lock nut 131 to lock the set screw in adjusted position. Each of the subassemblies 122 and 123 is secured in assembled relation with the spacing bar 21 by a machine screw 132 which extends through an elliptical aperture 133 of the spacing bar 21. As illustrated more clearly in FIGS. 1 and 6, the contact subassemblies 122 and 123 are positioned in sets in opposing relation transversely of the spacing bar 21 and there are plural sets of such subassemblies spaced longitudinally of the spacing bar 21. The total number of these sets corresponds to the number of star wheel bell cranks 92 with which the reader is provided to read a tabulating card having the same number of index-point rows. Since the index-point rows of the tabulating card are conventionally spaced more closely than it is conveniently feasible to space the relatively wider subassemblies 122 and 123 longitudinally of the spacing bar 21, the contact actuating levers 117 are offset from end to end as illustrated in FIG. 10. The amount of such offset varies with the relative position of a given one of the interposers 98 and the position of the corresponding contact subassembly sets 122 and 123.

The contact actuating arms 117 are guided at their lower ends by a comb 136 (FIGS. 6 and 8) extending between and secured to the side plates 12 and 13 of the subassembly 10. The actuating arms 117 are biased by a spring 137, extending between each actuating arm and an upturned forward edge flange 138 provided on the comb 136, into engagement with the edge of a transverse stop bar 139 secured beneath the comb 136. With the actuating arms 117 in engagement with the stop bar 139, the lower ends of the actuating arms overlie in latching relation the right-hand ends (as seen in FIGS. 6 and 8) of the interposers 98 and thus prevent the latter from pivoting about the bail 102 under bias of the springs 100. Also in this position of the actuating arms 117, the electrical contacts of the contact subassembly 122 are in closed contact position and the electrical contacts of the subassembly 123 are in open-contact position.

The operation of the tabulating card reader will now be considered with reference to the operation of one star wheel bell crank 92, its associated interposer 98, the associated contact actuating lever 117, and the set of contact subassemblies 122 and 123 actuated by the latter. It will, however, be understood that the described operation of these components applies in all respects to the operation of other similar components in the reader.

Assume at the outset that the reader stands ready to perform a tabulating card reading operation, and that a tabulating card 47 (FIG. 6) has been manually inserted into reading position in the card guide aperture formed by the elements 44–46. The lower or leading edge of the card 47 at this time engages the card stop portions 48 provided on spaced ones of the discs 31 of the main feed roll 30. The tabulating card 47 may be manually inserted into this position since the previous card reading operation terminated with the pressure roll discs 50 spaced from the discs 31 of the main feed roll 30 by reason of the fact that the pressure roll 49 was latched in spaced position by latched engagement to its supporting arms 52 and 53 with the latch arms 60. The area of the tabulating card 47 between its leading edge and its first index-point column is conventionally non-perforated as previously explained so that two adjacent teeth of the star wheel 91 engage the rear surface of the card and position the bell cranks 92 with their latch portions 97 raised into latching relation to their associated interposers 98. This is also the position of the components last mentioned when, during the card reading operation, a star wheel senses the absence of a code aperture in the card.

The card reading operation of the reader is preceded by energization of the pressure-roll latch-release electromagnets 65, which thereupon attract the armature 64 to rotate the latch bail arms 60 against the bias of their springs 62, and unlatch the pressure roll support arms 52 and 53. The latter, under bias of the springs 68, move the pressure roll 49 to engage its discs 50 with the front surface of the card and thereby press the latter into engagement with the discs 31 of the main feed roll 30. This movement of the support arms 52 and 53 actuates the electrical contacts 74 to closed-contact position to signify engagement of the pressure roll with the tabulating card.

The reader operation is now initiated by energization of the electromagnet (not shown) of the clutch 25 mechanically to couple the power drive pulley 29 to the driven shaft 23. Assuming that the energization of the clutch electromagnet is of brief duration, the driven shaft 23 rotates ninety angular degrees where it halts by reason of the fact that the clutch 25 interrupts the mechanical connection between the shaft and the drive pulley 29.

This angular movement of the shaft 23 is accompanied by corresponding angular movements of the cams 108 and 116. It was previously pointed out that this angular movement is initiated with the cam follower 105 resting upon the intermediate step of the cam 108 as illustrated in FIG. 6, so that counter-clockwise rotation of the cam 108 (as indicated by the directional arrow) acts to bring the lowest step of the cam 108 beneath the cam follower 105. This produces clockwise rotation of the bell cranks 103 and bail 102. The interposer 98 follows this motion of the bail 102, under bias of the interposer spring 100, until the end of the interposer engages the now-raised latch portion 97 of the star wheel bell crank 92 (the star wheel 91 at this time senses the absence of a code aperture in the tabulating card 47). Upon engagement of the interposer 98 with the latch portion 97, the forward movement of the interposer is halted and this occurs before its right-hand end (as seen in FIG. 6) can move out from beneath the end of the associated contact actuator 117. The bail 102 continues to move forwardly, and in doing so moves out of engagement with the interposer 98, until the cam follower 105 rests upon the lowest step of the cam 108. As the cam 108 continues its counter-clockwise rotation, its highest step lobe is brought under the cam follower 105 to rotate the bell cranks 103 and bail 107 in counter-clockwise direction. The bail 102, previously withdrawn from contact with the portion 99 of the interposer 98, eventually returns into engagement with the interposer and moves the interposer to the right (as seen in FIG. 6) so that the right-hand end of the interposer is moved further beneath the end of the contact actuator lever 117. Additional rotation of the cam 108 retains the bail 102 in counter-clockwise rotated position until near the end of the 90-degree angular rotation of the driven shaft 23, at which time the intermediate step of the cam 108 moves beneath the cam follower 105 to produce a small angular clockwise rotation of the crank arms 103 and bail 102. This partially withdraws the interposer 98 from beneath the end of the contact actuator lever 117. As this occurs, the cam 116 moves one of its lobes beneath the cam follower 114 to rotate the arms 112 and unlatch bail 111 counter-clockwise into engagement with the interposers 98. Such engagement serves no function under the prevailing operational conditions here considered. The 90-degree angular rotation of the shaft 23 ends with the cam follower 105 resting on the intermediate step of the cam 108 and with the cam follower 114 centered upon a lobe of the cam 116.

While all of the foregoing interposer drive actuations are taking place, the angular movement of the shaft 23 rotates the drive roll 30 through the interconnecting gearing 34, 35 and 33, 37. Specifically, this first 90-degree angular rotation of the shaft 23 causes the drive roll 30 to rotate through a small angle sufficient to advance the card to a position where its first index-point column is sensed for code apertures by the star wheels 91. Assume that a star wheel 91 senses a code aperture upon advance of the card. The rotational motion of the drive roll 30 terminates with a tooth of the star wheel 91 projecting through the code aperture as illustrated in FIG. 8. This causes the star wheel bell crank 92 to rotate clockwise bringing its latch portion 97 below the associated interposer 98. The latch portion 97 is in this position, as represented by curve A of FIG. 11, at a controllable-halt position of the shaft 23 when the electromagnet (not shown) of the clutch 25 can once more be briefly energized mechanically to couple the shaft 23 to the drive pulley 29 for a further 90-degree angular rotation of the shaft. Assume that the clutch electromagnet is so energized. Now as the cam 108 begins to rotate in counter-clockwise direction, the cam follower 105 remains on the intermediate step of the cam for the first two degrees of cam rotation as represented by curve B of FIG. 11, and thereafter begins to drop onto the lower step of the cam. As it does so, the bail 102 moves clockwise as earlier explained and is followed in this motion by the interposer 98. Had the latch portion 97 of the bell crank 92 been in elevated position as in the operating condition first described, the end of the interposer 98 would have engaged the latch portion 97 after six degrees of rotation of the cam 108 as indicated on curve B. Under the condition here assumed, however, the latch portion 97 is in lowered position and accordingly the interposer 98 moves over the latch portion 97 as the interposer continues to follow the rotational motion of the bail 102.

At ten degrees of rotation of the cam 108, the right-hand end of the interposer 98 moves from beneath the end of its associated contact actuator lever 117 as indicated on curve B. In the meantime, rotation of the cam 116 causes its lobe to move out from beneath the cam follower 114 to rotate the arms 112 and latch bail 111 away from the interposers as represented by curve C of FIG. 11. Thus when the right-hand end of the interposer 98 moves out from beneath the end of the actuating lever 117, the interposer is free to pivot about its engagement with the bail 102 under bias of the spring 100. This pivotal motion of the interposer 98 is terminated when the interposer engages the unlatch bail 111. The bail 102 continues its clockwise rotation to 19 degrees of rotation of the cam 108, at which time the unlatch bail 111 has been rotated to its maximum clockwise position, and thereafter the highest step of the cam 108 begins to move beneath the cam follower 105 to initiate counter-clockwise rotation of the crank arms 103 and bail 102.

At approximately 26 degrees of the angular rotation of the cam 108, the interposer 98 in pivoted position is moved by the bail 102 into engagement with the end of the contact actuator lever 117. Further counter-clockwise rotation of the bail 102 moves the interposer 98 to the right as seen in FIG. 8 and drives the contact actuator lever 117 counter-clockwise through its engagement with the interposer 98. The contact actuator lever 117 opens the contacts of the contact subassembly 122 and closes those of the subassembly 123 between 40 degrees and 75 degrees of rotation of the cam 108.

At 29 degrees of rotation of the cam 108, the left-hand end of the interposer 98 clears the end of the latch portion 97 of the star wheel bell crank 92 as indicated on curve B. Previous to this time, the driven shaft 23 had begun the rotation of the drive roll 30 to advance the tabulating card to its next index-point column. The interposer 98, having thus cleared the end of the latch portion 97, permits the star wheel bell crank 92 to rotate counter-clockwise should its star wheel 91 sense an absence of a code aperture in the next index-point column of the card. Curve A of FIG. 11 assumes that upon further advance of the tabulating card the star wheel senses the absence of a code aperture in the next index-point column of the card, and the resulting counter-clockwise rotation of the star wheel bell crank 92 arrives at the mid-range of its motion at approximately 51 degrees of rotation of the driven shaft 23 and has completed its movement upon completion of the 90-degree angular rotation of the shaft 23. Had the star wheel found a code aperture in the next index-point column of the card, the star wheel bell crank would have remained in its full clockwise rotated position as indicated by the horizontal broken line portion of curve A.

At 70 degrees of rotation of the shaft 23, the cam 106 begins to move a lobe beneath the cam follower 114 and depress the unlatch bail 111. The latter ultimately depresses all of the interposers 98 beneath the ends of their associated contact actuating arms 117 to allow the actuating arms 117 to return under bias of their springs 137 into engagement with the stop bar 139. This again closes the contacts of the contact subassembly 122 and opens the contacts of the contact subassembly 123. At 75 degrees of rotation of the cam 108, the cam follower 105 begins to drop onto the intermediate step of this cam and reaches the step at approximately 88 degrees of the cam rotation as represented by curve B. The cam-follower arm 114 reaches the peak of a lobe of the cam 116 also at approximately 88 degrees of cam rotation, as indicated by curve C.

During the 90-degree angular rotation of the shaft 23 last considered, one of the cams 81 (FIG. 3) has actuated a corresponding set of contacts 88 to closed-contact position at approximately 41 degrees of angular rotation of the cam, as represented by curve D, and the contacts are maintained closed until approximately 74 degrees of cam rotation. It is through these contacts that the contacts of the contact subassemblies 122 and 123 are energized to derive the output coded electrical signals representative of the coded information read from each index-point column of the tabulating card. To this end, it will be noted from curve D that the contacts of the contact assembly 88 close after positioning of the contacts of the subassemblies 122 and 123 and open just before repositioning of the contacts of the latter.

The foregoing description of the reader operation assumes that the electromagnet (not shown) of the clutch 25 is energized for a brief interval each time it is desired to read the next index-point column of the tabulating card. It will be evident, however, that a continuing succession of index-point columns may be read by maintaining the clutch electromagnet continuously energized until an index-point column of the card is reached at which it is desired that the reader operation temporarily halt.

The standard tabulating card records a maximum of eighty alpha-numeric characters, symbols, or functional control items of information by use of eighty index-point columns of the card. After reading the last index-point column of the card, the next several 90-degree angular rotations of the driven shaft 23 engage the segmental gears 57 and 58 on the main feed roll 30 with the one-tooth segmental gears 59 provided on the pressure roll 49 and cause these engaged gear elements to move the pressure roll 49 to a position where its support arms 52 and 53 are latched by the latch arms 60. Upon separation of the pressure roll 49 from the main feed roll 30, the tabulating card drops under gravity out of the reader into a card hopper, not shown. The next several 90-degree rotations of the driven shaft 23 move the main feed roll 30 to its "home" position where the feeler shaft 78 (FIG. 3) enters the notch 77 of the cam 76 to bring the tabulating card reading operation to a halt.

The tabulating card feed mechanism of the present reader is disclosed and claimed in the copending application of Wilbur C. Ahrns, Serial No. 249,202, filed January 3, 1963, entitled Tabulating Card Reader, and assigned to the same assignee as the present application.

It will be apparent from the foregoing description of the invention that a tabulating card reader embodying the invention enables lightly biased code-aperture-sensing star-wheel reader elements to provide positive and consistently reliable control over large values of available electrical-contact actuating forces so that the reader may readily employ multiple contact stacks of reader contact assemblies requiring in operation substantial actuating forces. A tabulating card reader embodying the invention has the further advantages of a relatively simple yet sturdy and compact construction characterized by consistently high operational reliability over prolonged periods of operation and without need for significant maintenance care or attention.

While a specific form of the invention has been described for purposes of illustration, it is contemplated that numerous changes may be made without departing from the spirit of the invention.

I claim:

1. A tabulating card reader comprising a plurality of sensing elements adapted to sense concurrently by index-point columns code apertures in individual ones of plural index-point rows of a tabulating card, a plurality of pairs of output-coded-information electrical contacts each having an actuating member, means for transporting a tabulating card by successive index-point column steps past said sensing elements, power driven means having a cycle of reciprocatory motion in relation to each step drive of said transporting means, a plurality of pivotally supported interposers pivotally controlled individually by any of said sensing elements which sense a corresponding code aperture in said card and reciprocated concurrently by said power driven means for pivotally engaging and cyclically actuating corresponding individual ones of said electrical-contact actuating members to effect by resultant actuation of said contacts translation of an item of coded information read from said card, and a power-driven reciprocatory bail member actuated into concurrent engagement with the pivoted ends of said interposers near the end of each cycle of said power driven means for interrupting the engagement of said interposers with said electrical-contact actuating members.

2. A tabulating card reader comprising a plurality of aperture sensing star wheels pivotally supported upon individual pivotal levers and adapted to sense concurrently by index-point columns code apertures in individual ones of plural index-point rows of a tabulating card, a plurality of coded-information output translating elements, means for transporting a tabulating card by successive index-point-column steps past said sensing elements, power driven means having a cycle of motion in relation to each step drive of said transporting means, and means controlled individually by pivotal positioning of any of said levers the star wheel of which senses a corresponding code aperture in said card for causing said power driven means cyclically to actuate a corresponding individual one of said translating elements to effect by said translating elements translation of an item of coded information read from said card.

3. A tabulating card reader comprising a plurality of aperture sensing star wheels pivotally supported upon individual pivotal levers and adapted to sense concurrently by index-point columns code apertures in individual ones of plural index-point rows of a tabulating card, a plurality of pairs of output-coded-information electrical contacts each having an actuating member, means for transporting a tabulating card by successive index-point-column steps past said sensing elements, power driven means having a cycle of reciprocatory motion in relation to each step drive of said transporting means, and a plurality of interposers controlled individually by pivotal positioning of any of said levers the star wheel of which senses a corresponding code aperture in said card for causing said power driven means cyclically to actuate a corresponding individual one of said electrical-contact actuating members to effect by resultant actuation of said electrical contacts translation of an item of coded information read from said card.

4. A tabulating card reader comprising a plurality of sensing elements adapted to sense concurrently by index-point columns code apertures in individual ones of plural index-point rows of a tabulating card, a plurality of coded information output translating elements each having an actuating member, means for transporting a tabulating card by successive index-point-column steps past said sensing elements, power driven means having a cycle of reciprocatory motion in relation to each step drive of said transporting means, a plurality of pivotally and reciprocably supported interposers engagingly coupled by individual tension springs to said power driven means to be concurrently reciprocably driven thereby, and means controlled by individual ones of said sensing elements for normally restraining a corresponding individual one of said interposers against reciprocal driven movement thereof by said power driven means to restrain one end of individual ones of said interposers latched against pivotal movement by latched engagement with the end of an individual one of said actuating members but responsive to the individual sensing by any of said sensing elements of a corresponding code aperture in said card for releasing a corresponding one of said interposers for reciprocal and pivotal movement into engagement with and cyclical actuation of a corresponding individual one of said translating-element actuating members to effect by resultant actuation of said translating elements translation of an item of coded information read from said card.

5. A tabulating card reader comprising a plurality of aperture sensing star wheels pivotally supported upon individual pivotal bell cranks and adapted to sense concurrently by index-point columns code apertures in individual ones of plural index-point rows of a tabulating card, each said bell crank having a first angular position when its star wheel senses the absence of a code aperture and having a second position when its star wheel senses an aperture, a plurality of coded-information output translating elements each having an actuating lever, means for transporting a tabulating card by successive index-point-column steps past said sensing elements, power driven means having a cycle of reciprocatory motion in relation to each step drive of said transporting means, a plurality of pivotally and reciprocally supported interposers reciprocally controlled by said first position of an individual one of said bell cranks but reciprocally uncontrolled by said second position thereof to effect corresponding restraint and non-restraint of pivotal movement of a corresponding one of said interposers from non-driving engagement into driving engagement with an individual one of said actuating levers, and means for coupling said interposers to said power driven means for reciprocation therewith to actuate drivingly engaged ones of said levers and effect by resultant actuation of said translating elements translation of an item of coded information read from said card.

6. A tabulating card reader comprising a plurality of aperture sensing star wheels pivotally supported upon individual pivotal levers and adapted under spring bias of said levers to sense concurrently by index-point columns code apertures in individual ones of plural index-point rows of a tabulating card, a plurality of pairs of output-coded information electrical contacts, means for transporting a tabulating card by successive index-point-column steps past said sensing elements, power driven means having a cycle of reciprocatory motion in relation to each step drive of said transporting means, a plurality of interposers responsive individually to the pivotal positioning of any of said levers the star wheel of which senses a corresponding code aperture in said card for utilizing the motion of said power driven means cyclically to actuate a corresponding individual pair of said electrical contacts to enable said contacts to effect translation of successive items of coded information read from said card, and a power-driven reciprocatory bail member actuated into concurrent engagement with said interposers near the end of each cycle of said power driven means for terminating the motional actuation of said electrical contacts by said power driven means.

7. A tabulating card reader comprising a plurality of aperture sensing star wheels pivotally supported upon individual pivotal bell cranks and adapted to sense concurrently by index-point columns code apertures in individual ones of plural index-point rows of a tabulating card, each said bell crank having a first angular position when its star wheel senses the absence of a code aperture and having a second position when its star wheel senses an aperture, a plurality of coded-information output translating elements each having an actuating lever, means for transporting a tabulating card by successive index-point-column steps past said sensing elements, power driven means having a cycle of reciprocatory motion in relation to each step drive of said transporting means, a plurality of pivotally supported reciprocal interposers individually reciprocally responsive to said first position of a corresponding one of said bell cranks to have one end of the interposer restrained against pivotal movement by the end of an individual one of said levers but reciprocally responsive to said second position of the corresponding bell crank to move said one end of the interposer without said restraint and pivotally into driving engagement with said individual actuating lever, and means for coupling said interposers to said power driven means for reciprocation therewith to actuate drivingly engaged ones of said levers and effect by resultant actuation of said translating elements translation of an item of coded information read from said card.

8. A tabulating card reader comprising a plurality of aperture sensing star wheels pivotally supported upon individual pivotal bell cranks and adapted to sense concurrently by index-point columns code apertures in individual ones of plural index-point rows of a tabulating card, each said bell crank having a first angular position when its star wheel senses the absence of a code aperture and having a second position when its star wheel senses an aperture, a plurality of coded-information output translating elements each having an actuating lever, means for transporting a tabulating card by successive index-point-column steps past said sensing elements, a power driven bail having a cycle of reciprocatory motion in relation to each step drive of said transporting means, a plurality of interposers reciprocally guided and pivotally movable on said bail and individually reciprocally responsive to said first position of a corresponding one of said bell cranks to have one end of the interposer restrained against pivotal movement by the end of an individual one of said levers but reciprocally responsive to said second position of the corresponding bell crank to move said one end of the interposer without said restraint and pivotally into driving engagement with said individual actuating lever, and means for biasing said interposers toward engagement with said bail for reciprocation therewith to actuate drivingly engaged ones of said levers and effect by resultant actuation of said translating elements translation of an item of coded information read from said card.

9. A tabulating card comprising a plurality of aperture sensing star wheels pivotally supported upon individual pivotal bell cranks and adapted to sense concurrently by index-point columns code apertures in individual ones of plural index-point rows of a tabulating card, each said bell crank having a first angular position when its star wheel senses the absence of a code aperture and having a second position when its star wheel senses an aperture, a plurality of coded-information output translating elements each having an actuating lever, means for transporting a tabulating card by successive index-point-column steps past said sensing elements, power driven means having a cycle of reciprocatory motion in relation to each step drive of said transporting means, a plurality of pivotally and reciprocally supported interposers reciprocally controlled by said first position of an individual one of said bell cranks but reciprocally uncontrolled by said second position thereof to effect corresponding latched restraint and unlatched nonrestraint of pivotal movement of one end of a corresponding one of said interposers with respect to the end of an individual one of said levers, and means for coupling said interposers to said power driven means for driven reciprocation therewith and unlatched pivotal movement into driving engagement with individual ones of said levers to effect by resultant actuation of said translating elements translation of an item of coded information read from said card.

10. A tabulating card reader comprising a plurality of aperture sensing star wheels pivotally supported upon individual pivotal bell cranks and adapted to sense concurrently by index-point-columns code apertures in individual ones of plural index-point rows of a tabulating card, each said bell crank having a first angular position when its star wheel senses the absence of a code aperture and having a second position when its star wheel senses an aperture, a plurality of coded-information output translating elements each having an actuating lever, power driven means for transporting a tabulating card by successive index-point-column steps past said sensing elements, a bail member power driven by cam and cam follower to have a cycle of reciprocatory motion in relation to each step drive of said transporting means, a plurality of pivotally and reciprocally supported interposers reciprocally controlled by said first position of an individual one of said bell cranks but reciprocally uncontrolled by said second position thereof to effect corresponding restraint and non-restraint of pivotal movement of a corresponding one of said interposers from non-driving engagement into driving engagement with an individual one of said actuating levers, and means for resiliently coupling said interposers to said bail member for driven reciprocation therewith to actuate drivingly engaged ones of said levers and effect by resultant actuation of said translating elements translation of an item of coded information read from said card.

11. A tabulating card reader comprising a plurality of aperture sensing star wheels pivotally supported upon individual pivotal bell cranks and adapted to sense concurrently by index-point columns code apertures in individual ones of plural index-point rows of a tabulating card, each said bell crank having a first angular position when its star wheel senses the absence of a code aperture and having a second position when its star wheel senses an aperture, a plurality of coded-information output translating elements each having an actuating lever, means power driven under step-by-step control for transporting a tabulating card by successive index-point-column steps past said sensing elements, a bail member power driven by cam and cam follower to have a cycle of reciprocatory motion in relation to each step drive of said transporting means, a plurality of pivotally and reciprocally supported interposers reciprocally controlled by said first position of individual ones of said bell cranks but reciprocally uncontrolled by said second position thereof to effect corresponding latched restraint and unlatched non-restraint of pivotal movement of one end of corresponding ones of said interposers with respect to the end of individual ones of said actuating levers, means for coupling said interposers to said bail member for driven reciprocation therewith and unlatched pivoted movement into driving engagement with individual ones of said levers to effect by resultant actuation of said translating elements translation of an item of coded information read from said card, and cam and cam-follower means for effecting movement of all of said interposers to unlatched engagement with their corresponding actuating levers near the end of each cycle of said bail member to terminate the driving engagement of said interposers with said actuating levers.

12. A tabulating card reader comprising a plurality of aperture sensing star wheels pivotally supported upon individual pivotal bell cranks and adapted to sense concurrently by index-point columns code apertures in individual ones of plural index-point rows of a tabulating card, each said bell crank having a first angular position when its star wheel senses the absence of a code aperture and having a second position when its star wheel senses an aperture, a plurality of coded-information output translating elements each having an actuating lever, reader drive means adapted to have continuous power drive, driven means mechanically coupled under step-by-step control to said reader drive means for transporting a tabulating card by successive index-point column steps past said sensing elements, a bail member mechanically driven by cam and cam follower from said driven means to have a cycle of reciprocatory motion in relation to each step drive of said transporting means, a plurality of pivotally and reciprocally supported interposers reciprocally controlled by said first position of individual ones of said bell cranks but reciprocally uncontrolled by said second position thereof to effect corresponding latched restraint and unlatched non-restraint of pivotal movement of one end of corresponding ones of said interposers with respect to the end of individual ones of said actuating levers, means for coupling said interposers to said bail member for reciprocation therewith and unlatched pivoted movement into driving engagement with individual ones of said levers to effect by resultant actuation of said translating elements translation of an item of coded information read from said card, and means mechanically driven by cam and cam follower from said driven means for effecting movement of all of said interposers to said restraint latched engagement with the ends of their corresponding atctuating levers near the end of each cycle of said bail member to terminate the driving engagement of said interposers with said actuating levers.

13. A record medium reader comprising a plurality of sensing elements adapted to sense concurrently by index-point columns code apertures in individual ones of plural index-point rows of a record medium, a plurality of coded information output translating elements each having an actuating member, means for transporting a record medium by successive index-point-column steps past said sensing elements, power driven means including a driven bail having a cycle of reciprocatory motion in relation to each step drive of said transporting means, a plurality of interposers supported for reciprocal motion and connected by individual tension springs to said driven bail for reciprocal motion therewith and for concurrent pivotal motion thereon to engage and actuate a corresponding individual one of said translating element actuating members, and a plurality of interposer restraining means controlled by individual ones of said sensing elements and responsive to the absence of a corresponding aperture sensed thereby for restraining individual ones of said interposers against reciprocal movement with said driven bail and pivotal movement thereon but responsive to the presence of a corresponding code aperture sensed by individual ones of said sensing elements for releasing corresponding individual ones of said interposers for reciprocal movement with said driven bail and pivotal movement thereon to effect said actuation of a corresponding individual one of said translating-element actuating members and thereby effect by resultant combinational actuations of said translating elements translation of an item of coded information read from said card.

14. A record medium reader comprising a plurality of sensing elements adapted to sense concurrently by index-point columns code apertures in individual ones of plural index-point rows of a record medium, a plurality of coded information output translating elements each having an actuating member, means for transporting a record medium by successive index-point-column steps past said sensing elements, power driven means including a driven bail having a cycle of reciprocatory motion in relation to each step drive of said transporting means, a plurality of interposers supported for reciprocal motion and connected by individual tension springs to said driven bail for reciprocal motion therewith and for concurrent pivotal motion thereon to engage and actuate a corresponding individual one of said translating element actuating members, a plurality of interposer restraining means controlled by individual ones of said sensing elements and responsive to the absence of a corresponding aperture sensed thereby for restraining individual ones of said interposers against reciprocal movement with said driven bail and pivotal movement thereon but responsive to the presence of a corresponding code aperture sensed by individual ones of said sensing elements for releasing corresponding individual ones of said interposers for reciprocal movement with said driven bail and pivotal movement thereon to effect said actuation of a corresponding individual one of said translating-element actuating members and thereby effect by resultant combinational actuations of said translating elements translation of an item of coded information read from said card, and means having a reciprocatory cycle of operation initiated subsequent to the reciprocal cycle of motion of said bail for concurrently pivoting all of said interposers in reverse pivotal motion to terminate actuating engagement of said interposers with said actuating members.

15. A record medium reader comprising a plurality of sensing elements adapted to sense concurrently by index-point columns code apertures in individual ones of plural index-point rows of a record medium, a plurality of coded information output translating elements each having an actuating member, means for transporting a record medium by successive index-point-column steps past said sensing elements, power driven means including a driven bail having a cycle of reciprocatory motion in relation to each step drive of said transporting means, a plurality of interposers adapted pivotally to engage said bail and each supported for reciprocal motion therewith between a first and a second position, one end of said each interposer in said first position being beneath the end of an individual one of said actuating members to prevent pivotal motion of said each interposer but in said second position being displaced from beneath said end of said individual actuating member to permit pivotal motion of said each interposer on said bail, a plurality of tension springs individually engagingly coupling said interposers to said driven bail for reciprocal motion therewith and for concurrent pivotal motion thereon to engage at said second position and actuate between said second and first interposer positions a corresponding individual one of said translating element actuating members, and a plurality of interposer restraining means controlled by individual ones of said sensing elements and responsive to the absence of a corresponding aperture sensed thereby for restraining individual ones of said interposers against movement with said driven bail from said first position thereof but responsive to the presence of a corresponding code aperture sensed by individual ones of said sensing elements for releasing corresponding individual ones of said interposers for reciprocal movement with said driven bail between said first and second positions thereof to effect said pivotal motion engagement and actuation of a corresponding individual one of said translating-element actuating members and thereby effect by resultant combination actuations of said translating elements translation of an item of coded information read from said card.

16. A record medium reader comprising a plurality of sensing elements adapted to sense concurrently by index-point columns code apertures in individual ones of plural index-point rows of a record medium, a plurality of coded information output translating elements each having an actuating member, means for transporting a record medium by successive index-point-column steps past said sensing elements, power driven means including a driven bail having a cycle of reciprocatory motion in relation to each step drive of said transporting means, a plurality of interposers supported for reciprocal motion and engagingly coupled by individual tension springs to said driven bail for reciprocal motion therewith and for concurrent pivotal motion thereon to engage and reciprocally actuate a corresponding individual one of said translating element actuating members, and a plurality of interposer motion restraining members each controlled by an individual one of said sensing elements from a first position indicative of the absence of a corresponding aperture sensed by said individual sensing elements to a second position indicative of the presence of a corresponding code aperture sensed by said individual sensing element, said restraining members in said first positions thereof operating to restrain individual ones of said interposers against reciprocal movement with said driven bail and pivotal movement thereon but operative in said second positions thereof to release corresponding individual ones of said interposers for reciprocal movement with said driven bail and pivotal movement thereon to effect said actuation of a corresponding individual one of said translating-element actuating members and thereby effect by resultant combinational actuations of said translating elements translation of an item of coded information read from said card.

17. A record medium reader comprising a plurality of sensing elements adapted to sense concurrently by index-point columns code apertures in individual ones of plural index-point rows of a record medium, a plurality of coded information output translating elements each having an actuating member, means for transporting a record medium by successive index-point-column steps past said sensing elements, power driven means including a driven bail having a cycle of reciprocatory motion in relation to each step drive of said transporting means, a plurality of interposers each adapted pivotally to engage said bail and each supported for reciprocal motion therewith between a first and a second position, one end of said each interposer in said first position lying beneath the end of an individual one of said actuating members to prevent pivotal motion of said each interposer but in said second position being displaced from beneath said end of said individual actuating member to permit pivotal motion of said each interposer on said bail, a plurality of tension springs individually engagingly coupling said interposers to said driven bail for reciprocal motion of said interposers therewith between said first and second interposer positions and for concurrent pivotal motion of said interposers on said bail to engage at said second position and actuate between said second and first interposer positions a corresponding individual one of said translating element actuating members, and a plurality of interposer latch members each controlled by an individual one of said sensing elements from a latch position indicative of the absence of a corresponding aperture sensed by said individual sensing element to an unlatch position indicative of the presence of a corresponding code aperture sensed by said individual sensing element, said restraining members in said latch positions thereof operating to restrain individual ones of said interposers against reciprocal movement with said driven bail and pivotal movement thereon but operative in said unlatch positions thereof to release corresponding individual ones of said interposers for reciprocal movement with said driven bail and pivotal movement thereon to effect said actuation of a corresponding individual one of said translating-element actuating members and thereby effect by resultant combinational actuations of said translating elements translation of an item of coded information read from said card.

References Cited by the Examiner
UNITED STATES PATENTS

| | | | |
|---|---|---|---|
| 2,290,827 | 7/1942 | Thomas | 235—61.11 X |
| 3,191,007 | 6/1965 | Mixer | 235—61.11 |

MAYNARD R. WILBUR, *Primary Examiner.*

D. W. COOK, *Examiner.*